Sept. 23, 1952  E. W. BELLIS  2,611,201
DISPLAY APPARATUS
Filed Dec. 2, 1949

Inventor
Edward W. Bellis

By *Clarence A. O'Brien and Harvey B. Jacobson*
Attorneys

UNITED STATES PATENT OFFICE 2,611,201

DISPLAY APPARATUS

Edward W. Bellis, Portland, Oreg.

Application December 2, 1949, Serial No. 130,813

1 Claim. (Cl. 40—65)

This invention relates to new and useful improvements and structural refinements in display apparatus, and the principal object of the invention is to facilitate illustrating components of structure so as to enable students to properly visualize the relationship of one component to another in an assembly.

This object is achieved by the provision of the instant device including sheets of material having representations of respective structural components thereon, one of these sheets being positioned upon another and being transparent, so that by inserting an opaque panel between two superimposed sheets, the representation depicted on the sheet under the transparent sheet may be blanked out and only the representation on the top, transparent sheet being exposed to view.

Some of the advantages of the invention reside in its simplicity of construction, in its convenient and efficient operation, and in its adaptability to economical manufacture.

With the above more important objects and features in view and such other objects and features as may become apparent as this specification proceeds, the invention consists essentially in the construction and arrangement of parts as shown in the accompanying drawings, in which.

Like characters of reference are employed to designate like parts in the specification and throughout the several views.

Figure 1:
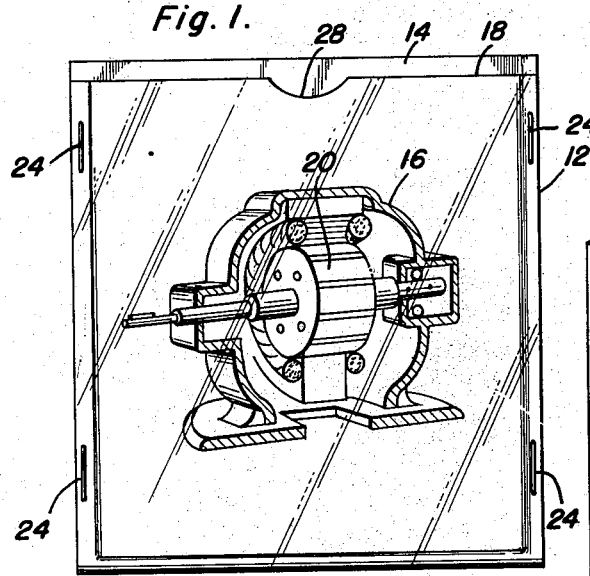
Figure 1 is a plan view of the invention with the opaque panel removed.
Figure 2:
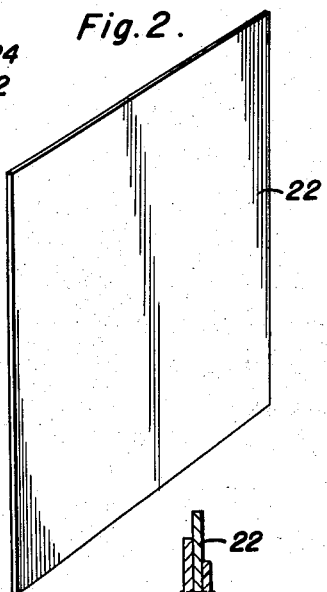
Figure 2 is a perspective view of the opaque panel per se.
Figure 3:
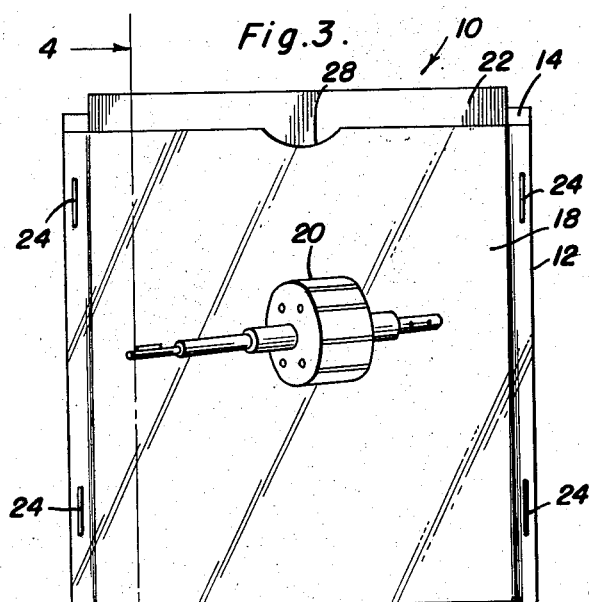
Figure 3 is a plan view, similar to that shown in Figure 1, but with the opaque panel inserted between the sheets.
Figure 4:
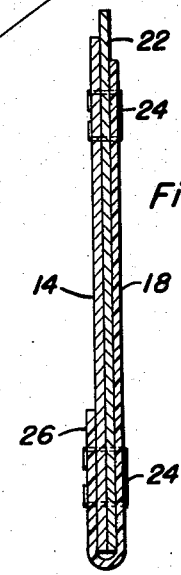
Figure 4 is a sectional detail, taken substantially in the plane of the line 4—4 in Figure 3.

Referring now to the accompanying drawings in detail, this invention consists of a display apparatus designated generally by the reference character 10, the same embodying in its construction a unit 12 consisting of a sheet 14 bearing a representation of a component of structure, such as for example is indicated at 16, while a second, transparent sheet 18 is superimposed on the sheet 14 and bears a representation of another component of the structure, as exemplified at 20. The two representations 16, 20 are so coordinated that when viewed through the transparent sheet 18, the representation 20 coacts with the representation 16 in depicting the structural assembly, but when an opaque panel 22 is interposed between the sheets 14, 18, the representation 16 depicted on the sheet 14 is blanked out and only the representation 20 depicted on the sheet 18 is exposed to view.

The sheets 14, 18 may be secured together at all but one marginal edge thereof, as indicated by the clips or staples 24 (or by any other means) so as to provide a pocket between the sheets for the reception of the panel 22. Moreover, the lower edge portion of the sheet 18 may be turned rearwardly under the sheet 14, as indicated at 26, for additional reinforcement.

However, it is to be understood that although in the accompanying drawings only one of the sheets 18 and one of the sheets 14 has been shown, the display unit may assume the form of several superimposed, transparent sheets, each provided with a pictorial representation of a component of a structural assembly, so that by simply inserting the opaque panel 22 between any two transparent sheets, the pictorial representations behind the panel may be blanked out and the structural assembly may be exposed to view in a series of progressive steps.

Referring again to the arrangement shown in the accompanying drawings, the sheet 14 may extend slightly above the sheet 18 and the latter may be provided with a notch 28, so that insertion and removal of the opaque panel 22 is facilitated.

It is believed that the advantages and use of the invention will be clearly apparent from the foregoing disclosure, and accordingly further description thereof at this point is deemed unnecessary.

Having described the invention, what is claimed as new is:

In an apparatus for illustrating components of a structure, the combination of a flat pocket including a back panel, a transparent front panel superposed thereon, fastener means securing together the front and back panels at the side and bottom edges thereof and affording an entrance opening at the top edge of the pocket, complemental pictorial representations provided on the front and back panels, and an opaque sheet slidably received in said pocket through said entrance opening for blanking out the pictorial representation on the back panel.

EDWARD W. BELLIS.

REFERENCES CITED

The following references are of record in the file of this patent:

UNITED STATES PATENTS

| Number | Name | Date |
|---|---|---|
| 965,321 | Pelstring | July 26, 1910 |
| 1,603,592 | Glasner | Oct. 19, 1926 |
| 1,981,923 | Miller | Nov. 27, 1934 |
| 2,091,260 | Farkas et al. | Aug. 31, 1937 |

FOREIGN PATENTS

| Number | Country | Date |
|---|---|---|
| 532,613 | England | Jan. 28, 1941 |